United States Patent
Yokoo

(10) Patent No.: US 11,860,523 B2
(45) Date of Patent: Jan. 2, 2024

(54) WAVELENGTH CONVERSION APPARATUS, LIGHT SOURCE APPARATUS, AND PROJECTOR

(71) Applicant: SEIKO EPSON CORPORATION, Tokyo (JP)

(72) Inventor: Tomohiro Yokoo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/704,125

(22) Filed: Mar. 25, 2022

(65) Prior Publication Data

US 2022/0317553 A1 Oct. 6, 2022

(30) Foreign Application Priority Data

Mar. 25, 2021 (JP) ................. 2021-051760

(51) Int. Cl.
*G03B 21/20* (2006.01)
*H04N 9/31* (2006.01)

(52) U.S. Cl.
CPC ......... *G03B 21/204* (2013.01); *G03B 21/208* (2013.01); *G03B 21/2066* (2013.01); *H04N 9/3161* (2013.01)

(58) Field of Classification Search
None
See application file for complete search history.

(56) References Cited

U.S. PATENT DOCUMENTS

| 2014/0153276 | A1 | 6/2014 | Nozaki |
| 2016/0040857 | A1* | 2/2016 | Inoue ........................ F21V 7/30 |
| | | | 362/343 |
| 2016/0195244 | A1* | 7/2016 | Harada ................. F21S 41/675 |
| | | | 359/885 |
| 2017/0137706 | A1 | 5/2017 | Fujita et al. |
| 2018/0284584 | A1* | 10/2018 | Itoh .................... G03B 21/2053 |

FOREIGN PATENT DOCUMENTS

| JP | 2014-095914 A | 5/2014 |
| JP | 2014-110173 A | 6/2014 |
| JP | 2016-027613 A | 2/2016 |
| JP | 2018-185388 A | 11/2018 |

\* cited by examiner

*Primary Examiner* — Bao-Luan Q Le
*Assistant Examiner* — Danell L Owens
(74) *Attorney, Agent, or Firm* — Dority & Manning, P.A.

(57) ABSTRACT

A wavelength conversion apparatus according to an aspect of the present disclosure includes a wavelength conversion layer that converts excitation light in terms of wavelength and an optical array layer formed of a plurality of cells each having a first surface on which light as a result of the wavelength conversion performed by the wavelength conversion layer is incident and a second surface via which the light exits. The optical array layer has a reflection surface that extends from the first surface to the second surface, is located at an interface between the cells adjacent to each other, and reflects the light.

12 Claims, 10 Drawing Sheets ly adjustable light intensity, and other features, such as light emitting diodes (LEDs) and laser diodes (LDs), have been used as a light source for a projector in place of fluorescent lamps and incandescent lamps, which have been mainstream light sources for projectors. For example, there is a known light emitting apparatus that is the combination of a solid-state light source that outputs blue light and a wavelength conversion mechanism (wavelength conversion apparatus) that absorbs the light from the solid-state light source as excitation light and converts the absorbed light into yellow light. In a light source apparatus including the light emitting apparatus, the blue light outputted from the solid-state light source and the yellow light emitted from the wavelength conversion apparatus are combined with each other into white light as illumination light for a projector or any other apparatus. For example, JP-A-2016-027613 discloses a wavelength conversion member including a laminate having a phosphor layer and light-transmissive heat dissipation layers formed on opposite sides of the phosphor layer and having thermal conductivity higher than that of the phosphor layer.

WAVELENGTH CONVERSION APPARATUS, LIGHT SOURCE APPARATUS, AND PROJECTOR

The present application is based on, and claims priority from JP Application Serial Number 2021-051760, filed Mar. 25, 2021, the disclosure of which is hereby incorporated by reference herein in its entirety.

BACKGROUND

1. Technical Field

The present disclosure relates to a wavelength conversion apparatus, a light source apparatus, and a projector.

2. Related Art

In recent years, solid-state light sources characterized by low power consumption, compactness, light weight, readily adjustable light intensity, and other features, such as light emitting diodes (LEDs) and laser diodes (LDs), have been used as a light source for a projector in place of fluorescent lamps and incandescent lamps, which have been mainstream light sources for projectors. For example, there is a known light emitting apparatus that is the combination of a solid-state light source that outputs blue light and a wavelength conversion mechanism (wavelength conversion apparatus) that absorbs the light from the solid-state light source as excitation light and converts the absorbed light into yellow light. In a light source apparatus including the light emitting apparatus, the blue light outputted from the solid-state light source and the yellow light emitted from the wavelength conversion apparatus are combined with each other into white light as illumination light for a projector or any other apparatus. For example, JP-A-2016-027613 discloses a wavelength conversion member including a laminate having a phosphor layer and light-transmissive heat dissipation layers formed on opposite sides of the phosphor layer and having thermal conductivity higher than that of the phosphor layer.

In the wavelength conversion member disclosed in JP-A-2016-027613, the excitation light before entering the phosphor layer spreads in the planar direction in the light-transmissive heat dissipation layer when viewed in the traveling direction of the excitation light, and the area of the fluorescence exiting region increases, resulting in a possible decrease in wavelength conversion efficiency.

SUMMARY

To solve the problem described above, a wavelength conversion apparatus according to an aspect of the present disclosure includes a wavelength conversion layer that converts excitation light in terms of wavelength and an optical array layer formed of a plurality of cells each having a first surface on which light as a result of the wavelength conversion performed by the wavelength conversion layer is incident and a second surface via which the light exits. The optical array layer has a reflection surface that extends from the first surface to the second surface, is located at an interface between the cells adjacent to each other, and reflects the light.

DESCRIPTION OF EXEMPLARY EMBODIMENTS

First Embodiment

A first embodiment of the present disclosure will be described below with reference to FIGS. 1 to 7.

Figure 1:
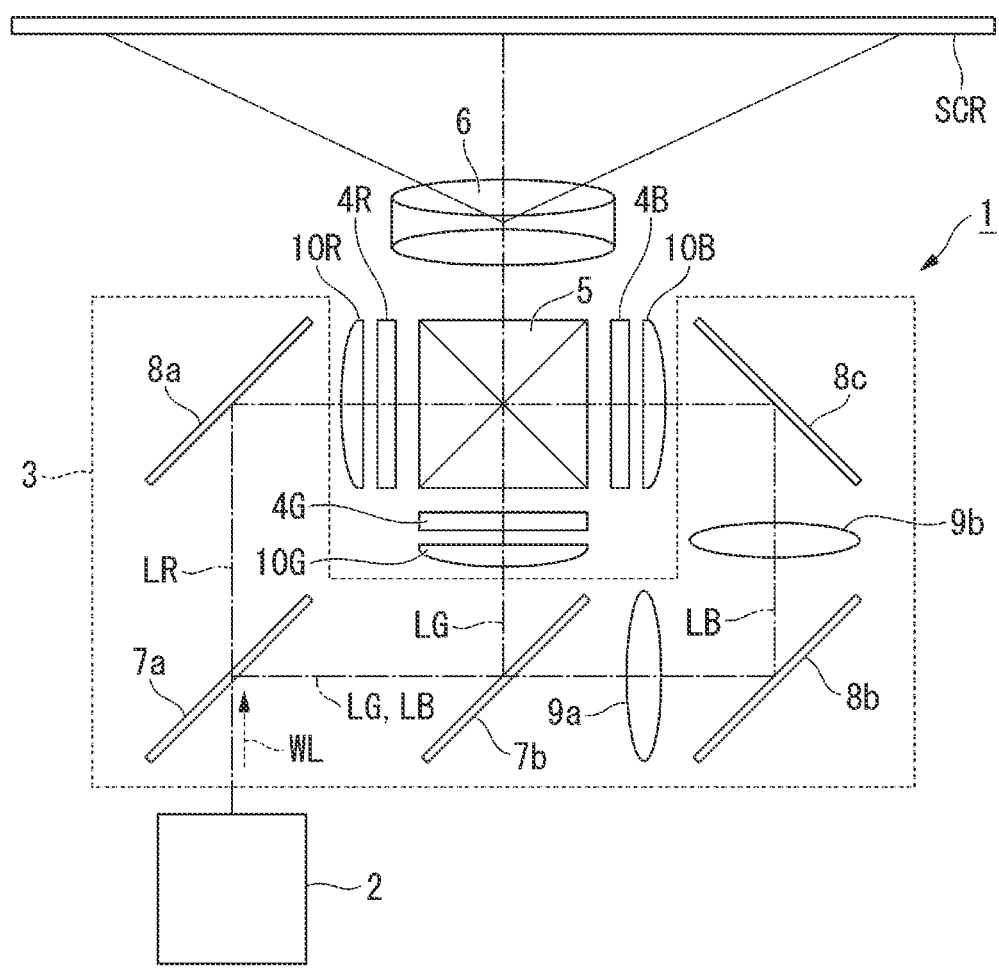
FIG. 1 is a schematic configuration diagram showing a projector according to a first embodiment.
Figure 2:
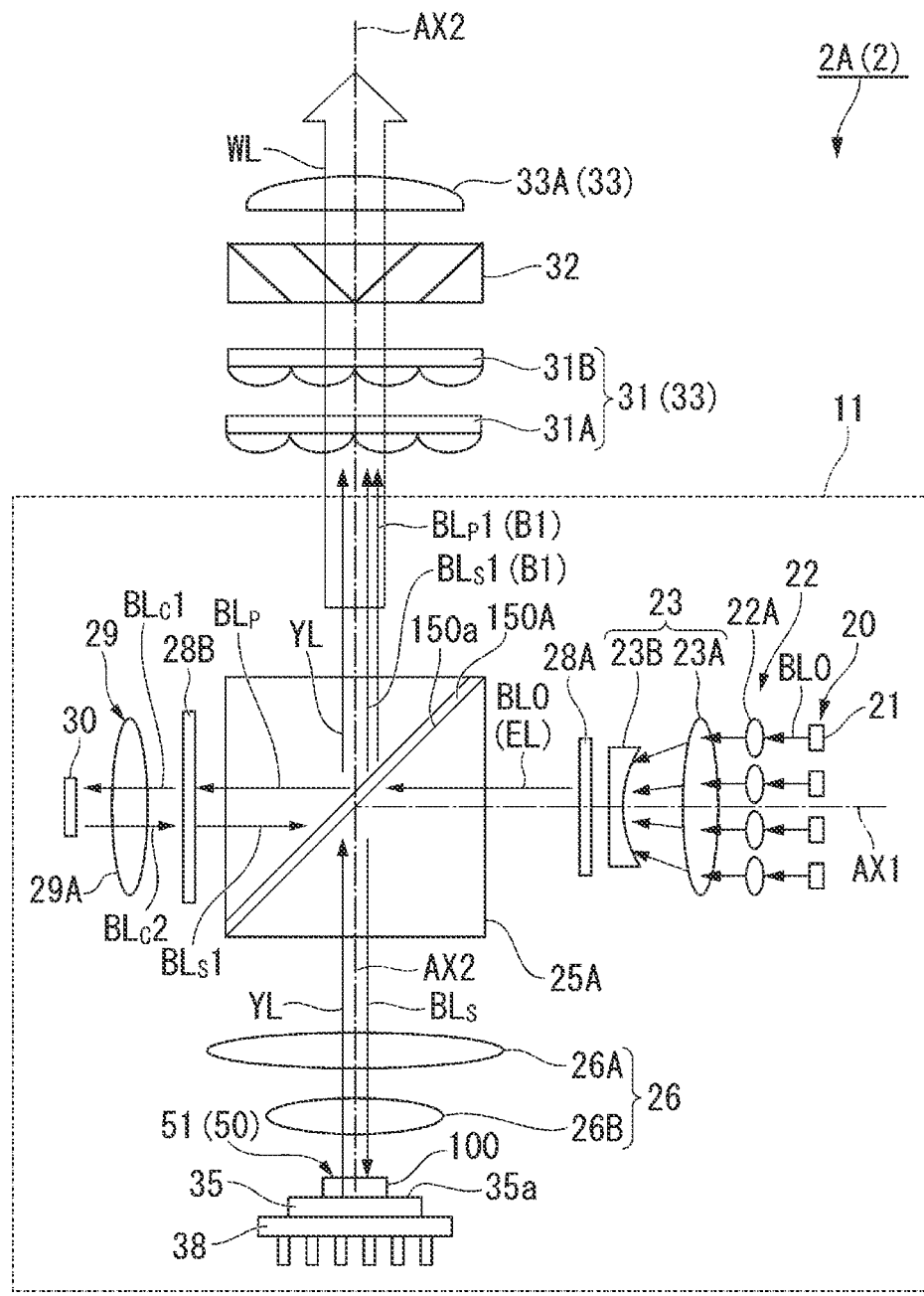
FIG. 2 is a schematic configuration diagram of a light source apparatus provided in the projector shown in FIG. 1.

FIG. 1 is a schematic configuration diagram showing a projector 1 according to the first embodiment. FIG. 2 is a schematic configuration diagram of a light source apparatus 2 provided in the projector 1. In the following drawings, components are drawn at different dimensional scales in some cases for clarification of each of the components.

The projector 1 is an example of a projector using three transmissive liquid crystal light valves as a light modulator. The light modulator may instead, for example, be reflective liquid crystal light valves. The light modulator may still instead be a light modulator that is not based on a liquid crystal material, such as a device using a micromirror or an apparatus including a DMD (digital micromirror device).

Projector

The configuration of the projector 1 will first be described.

The projector 1 includes the light source apparatus 2, a color separation system 3, light modulators 4R, 4G, and 4B, a light combining system 5, and a projection system 6, as shown in FIG. 1. The light source apparatus 2 outputs white light WL as illumination light. The color separation system 3 separates the white light WL outputted from the light source apparatus 2 into red light LR, green light LG, and blue light LB. The light modulators 4R, 4G, and 4B modulate the red light LR, the green light LG, and the blue light LB, respectively, in accordance with image information to form red image light, green image light, and blue image light. The light combining system 5 combines the red image light outputted from the light modulator 4R, the green image light outputted from the light modulator 4G, and the blue image light outputted from the light modulator 4B with one another. The projection system 6 projects the combined image light from the light combining system 5 toward a screen SCR.

The light source apparatus 2 outputs the white light WL, which is the illumination light, toward the color separation system 3, as will be described later with reference to FIG. 2. The white light WL contains, out of blue excitation light EL, that is, blue light BL0 outputted from an array light source 20, blue light BL having exited out of a wavelength converter 50 without being converted in terms of wavelength and yellow fluorescence YL generated by the wavelength conversion of the blue light BL0. The white light WL is adjusted by the light source apparatus 2 so as to have a substantially uniform illuminance distribution.

The color separation system 3 includes a first dichroic mirror 7a, a second dichroic mirror 7b, a first reflection mirror 8a, a second reflection mirror 8b, and a third reflection mirror 8c, as shown in FIG. 1. The first dichroic mirror 7a separates the white light WL outputted from the light source apparatus 2 into the red light LR and the mixture of the green light LG and the blue light LB. To this end, the first dichroic mirror 7a transmits the red light LR and reflects the green light LG and the blue light LB. The second dichroic mirror 7b separates the mixture of the green light LG and the blue light LB into the green light LG and the blue light LB. To this end, the second dichroic mirror 7b reflects the Green light LG and transmits the blue light LB.

The first reflection mirror 8a is disposed in the optical path of the red light LR and reflects the red light LR having passed through the first dichroic mirror 7a toward the light modulator 4R. The second reflection mirror 8b and the third reflection mirror 8c are disposed in the optical path of the blue light LB and reflects the blue light LB having passed through the second dichroic mirror 7b to guide the blue light LB to the light modulator 4B.

When transmitting the red light LR, the light modulator 4R modulates the light in accordance with image information to form red image light. Similarly, when transmitting the green light LG, the light modulator 4G modulates the light in accordance with image information to form green image light. When transmitting the blue light LB, the light modulator 4B modulates the light in accordance with image information to form blue image light. The light modulators 4R, 4G, and 4B are each formed, for example, of a liquid crystal panel. Polarizers (not shown) are disposed on the light incident side and the light exiting side of each of the light modulators 4R, 4G, and 4B. A field lens 10R, which converts the red light LR incident on the light modulator 4R into parallelized light, is provided on one side of the light modulator 4R that is the side on which the red light LR is incident. A field lens 10G, which converts the green light LG incident on the light modulator 4G into parallelized light, is provided on one side of the light modulator 4G that is the side on which the green light LG is incident. A field lens 10B, which converts the blue light LB incident on the light modulator 4B into parallelized light, is provided on one side of the light modulator 4B that is the side on which the blue light LB is incident.

The light combining system 5 is formed, for example, of a cross dichroic prism. The light combining system 5 combines the red image light outputted from the light modulator 4R, the green image light outputted from the light modulator 4G, and the blue image light outputted from the light modulator 4B with one another and exits the combined image light toward the projection system 6.

The projection system 6 is formed of a plurality of projection lenses. The projection system 6 enlarges the combined image light from the light combining system 5 and projects the enlarged image light toward the screen SCR. Enlarged color video images are displayed on the screen SCR.

Light Source Apparatus

The configuration of the light source apparatus 2 will next be described.

A light source apparatus 2A according to the first embodiment includes a light emitting unit 11, an integration optical system 31, a polarization converter 32, and a superimposing lens 33A, as shown in FIG. 2. The optical integration system 31 and the superimposing lens 33A form a superimposing system 33.

The light emitting unit 11 includes the array light source 20, a collimator optical system 22, a condenser optical system 23, a first phase retarder 28A, an optical element 25A including a polarization separator 150A, a first condenser optical system 26, the wavelength conversion apparatus 50, a second phase retarder 28B, a second condenser optical system 29, and a diffusive reflector 30.

The array light source 20, the collimator optical system 22, the condenser optical system 23, the first phase retarder 28A, the optical element 25A, the second phase retarder 28B, the second condenser optical system 29, and the diffusive reflector 30 are sequentially arranged along an optical axis AX1. On the other hand, the wavelength conversion apparatus 50, the first condenser optical system 26, the optical element 25A, the optical integration system 31, the polarization converter 32, and the superimposing lens 33A are sequentially arranged along an optical axis AX2. The optical axes AX1 and AX2 are present in the same plane and perpendicular to each other.

The array light source 20 includes a plurality of semiconductor lasers (excitation light sources) 21 as the solid-state light source. The plurality of semiconductor lasers 21 are arranged in an array in a plane perpendicular to the optical axis AX1. The semiconductor lasers 21 each output, for example, the blue light BL0 as the excitation light EL, which excites a wavelength conversion layer 80 of the wavelength conversion apparatus 50. The peak wavelength of the blue light BL0 is, for example, 445 nm and can be arbitrarily changed as long as the wavelength allows excitation of the wavelength conversion layer 80 as described above. The peak wavelength is determined in accordance with the fluorescing material of the wavelength conversion layer 80 and may, for example, be 460 nm.

The blue light BL0 outputted in the form of a pencil of light from the array light source 20 enters the collimator optical system 22. The collimator optical system 22 converts the blue light BL0 outputted from the array light source 20 into parallelized light. The collimator optical system 22 includes, for example, a plurality of collimator lenses 22A arranged in an array. The plurality of collimator lenses 22A are arranged in correspondence with the plurality of semiconductor lasers 21.

The blue light BL0 having passed through the collimator optical system 22 enters the condenser optical system 23. The condenser optical system 23 adjusts the luminous flux diameter of the blue light BL0. The condenser optical system 23 includes, for example, a convex lens 23A and a concave lens 23B.

The blue light BL0 having passed through the condenser optical system 23 enters the first phase retarder 28A. The first phase retarder 28A is, for example, a half wave plate configured to be rotatable substantially around the optical axis AX1. The blue light BL0 outputted from the semiconductor lasers 21 is linearly polarized. Appropriately setting the angle of rotation of the first phase retarder 28A allows the blue light BL0 passing through the first phase retarder 28A to be converted into a beam containing an S-polarized component and a P-polarized component with respect to the optical element 25A mixed with each other at a predetermined ratio. The ratio between the S-polarized component and the P-polarized component can be changed by rotating the first phase retarder 28A.

The blue light BL0 containing the S-polarized and P-polarized components generated when passing through the first phase retarder 28A enters the optical element 25A. The optical element 25A is, for example, a dichroic prism having wavelength selectivity. The dichroic prism has an inclining surface 150a, which inclines by an angle of 45° with respect to the optical axes AX1 and AX2 in the same plane.

The polarization separator 150A having wavelength selectivity is provided at the inclining surface 150a. The polarization separator 150A has a polarization separation function of separating the blue light BL0 into blue light $BL_S$, which is formed of the S-polarized component with respect to the polarization separator 150A, and blue light $BL_P$, which is formed of the P-polarized component with respect to the polarization separator 150A. That is, the polarization separator 150A reflects the blue light $BL_S$ and transmits the blue light $BL_P$ out of the blue light BL0 incident thereon. The polarization separator 150A further has a color separation function of transmitting the fluorescence YL, which has a wavelength band different from that of the blue light BL0, irrespective of the polarization state of the fluorescence YL.

The blue light $BL_S$ having exited out of the polarization separator 150A enters the first condenser optical system 26. The first condenser optical system 26 collects the blue light $BL_S$ and directs the collected blue light $BL_S$ toward the wavelength conversion apparatus 50. The first condenser optical system 26 includes, for example, a first lens 26A and a second lens 26B.

Figure 3:
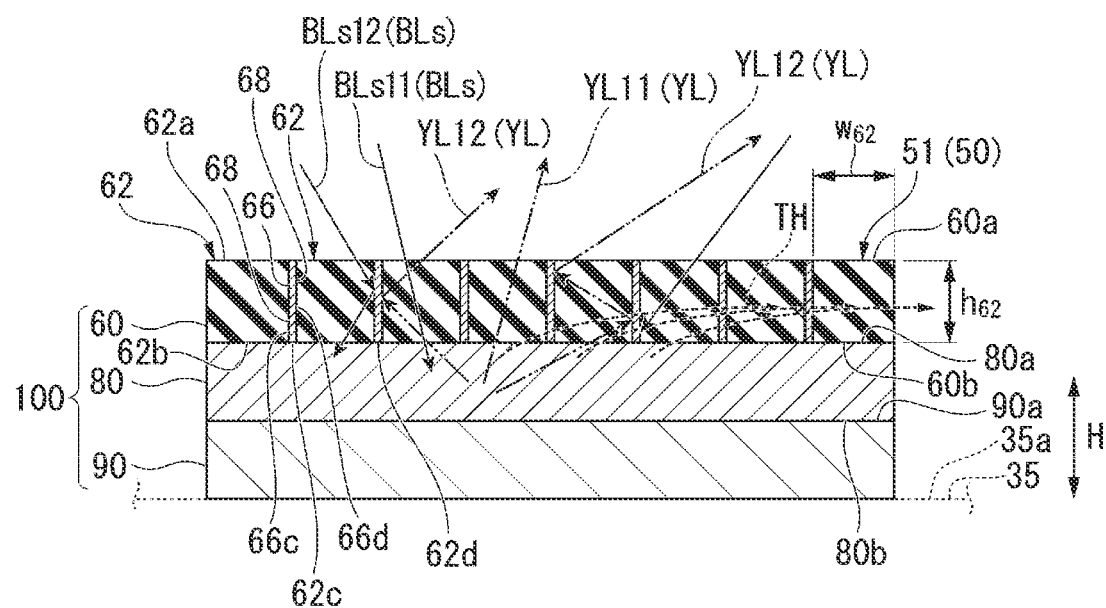
FIG. 3 is a cross-sectional view of part of a wavelength conversion apparatus taken according to the first embodiment and provided in the light source apparatus shown in FIG. 2.

In the light source apparatus 2A according to the first embodiment, the wavelength conversion apparatus 51 in the first embodiment is used as the wavelength conversion apparatus 50. FIG. 3 is an enlarged cross-sectional view of the key parts of the wavelength conversion apparatus 51 taken along the optical axis AX2. The wavelength conversion apparatus 51 includes the wavelength conversion layer 80, which converts the blue light (excitation light) $BL_S$ in terms of wavelength, as will be described later with reference to FIG. 3. The wavelength conversion layer 80 absorbs the blue light $BL_S$ and is therefore excited thereby and emits the yellow fluorescence YL having a peak wavelength, for example, within a wavelength region longer than or equal to 500 nm but shorter than or equal to 700 nm. The peak wavelength of the fluorescence YL differs at least from the peak wavelength of the blue light $BL_S$ and is determined in accordance with the fluorescing material of the wavelength conversion layer 80.

A reflection layer 90 is provided at one side of the wavelength conversion layer 80 that is the side opposite from the side on which the blue light $BL_S$ is incident, as shown in FIG. 3. The reflection layer 90 reflects a component of the fluorescence YL generated by the wavelength conversion layer 80 that is the component traveling toward a substrate 35 of the wavelength conversion apparatus 51. Part of the fluorescence YL generated by the wavelength conversion layer 80 is reflected off the reflection layer 90 and exits out of the wavelength conversion layer 80. The other part of the fluorescence YL generated by the wavelength conversion layer 80 exits out of the wavelength conversion layer 80 without traveling via the reflection layer 90.

A heat sink 38 is disposed at a surface of the substrate 35 that is the surface opposite from the surface that supports the wavelength conversion layer 80 and the reflection layer 90. In the wavelength conversion apparatus 51, heat generated by the wavelength conversion layer 80 can be dissipated via the heat sink 38, thermal degradation of the wavelength conversion layer 80 can be avoided.

The fluorescence YL emitted from the wavelength conversion layer 80 is unpolarized light. After passing through the first condenser optical system 26, the fluorescence YL enters the polarization separator 150A. The fluorescence YL having entered the polarization separator 150A travels from the polarization separator 150A toward the optical integration system 31.

On the other hand, the P-polarized blue light $BL_P$ having exited out of the polarization separator 150A enters the second phase retarder 28B, as shown in FIG. 2. The second phase retarder 28B is, for example, a quarter wave plate disposed in the optical path between the polarization separator 150A and the diffusive reflector 30. The blue light $BL_P$ having exited out of the polarization separator 150A is therefore converted by the second phase retarder 28B, for example, into right-handed circularly polarized blue light $BL_C1$ having a polarization rotation direction around the optical axis AX1, which then enters the second condenser optical system 29. The second condenser optical system 29 includes, for example, a lens 29A and causes the blue light $BL_C1$ in the form of a collected light to be incident on the diffusive reflector 30.

The diffusive reflector 30 is disposed on one side of the polarization separator 150A that is the side opposite from the array light source 20 and diffusively reflects the blue light $BL_C1$ having exited out of the second condenser optical system 29 toward the polarization separator 150A. The diffusive reflector 30 is, for example, an element that reflects the blue light $BL_C1$ in a Lambertian reflection scheme but does not disturb the polarization state thereof.

The light diffusively reflected off the diffusive reflector 30 is hereinafter referred to as blue light $BL_C2$. The diffusively reflected blue light $BL_C1$ forms the blue light $BL_C2$ having a substantially uniform illuminance distribution. For example, the right-handed circularly polarized blue light $BL_C1$ is reflected in the form of left-handed circularly polarized blue light $BL_C2$. The blue light $BL_C2$ is converted by the second condenser optical system 29 into parallelized light and then enters the second phase retarder 28B again.

The left-handed circularly polarized blue light $BL_C2$ is converted by the second phase retarder 28B into S-polarized blue light $BL_S1$. The blue light $BL_S1$ is reflected off the polarization separator 150A toward the optical integration system 31.

The blue light $BL_S1$, along with the fluorescence YL having passed through the polarization separator 150A, is used to form the white light WL. That is, the blue light $BL_S1$ and the fluorescence YL both exit out of the polarization separator 150A in the same direction to form the white light WL, which is the combination of the blue light $BL_S1$ and the yellow fluorescence YL.

The white light WL exits toward the optical integration system 31. The optical integration system 31 includes, for example, a lens array 31A and a lens array 31B. In each of the lens arrays 31A and 31B, a plurality of microlenses are arranged along the direction perpendicular to the optical axis AX2, that is, along the optical axis AX1. The white light WL having passed through the optical integration system 31 enters the polarization converter 32. The polarization converter 32 includes polarization separation films and retardation films. The polarization converter 32 converts the unpolarized white light WL into linearly polarized light.

The white light WL converted in terms of polarization by the polarization converter 32 enters the superimposing lens 33A. The superimposing lens 33A cooperates with the optical integration system 31 to homogenize the illuminance distribution of the white light WL in an illumination receiving region. The light source apparatus 2A outputs the white light WL along the optical axis AX2, as described above.

Wavelength Conversion Apparatus

The wavelength conversion apparatus 51 according to the first embodiment will next be described. The wavelength conversion apparatus 51 includes an optical array layer 60, the wavelength conversion layer 80, the reflection layer 90, the substrate 35, and the heat sink 38. The optical array layer 60, the wavelength conversion layer 80, and the reflection layer 90 form a wavelength converter 100, which absorbs blue light $BL_S$ and generates the fluorescence YL, in the wavelength conversion apparatus 51. The reflection layer 90, the wavelength conversion layer 80, and the optical array layer 60 of the wavelength converter 100 are sequentially laminated on a surface 35a of the substrate 35. The substrate 35 is made of a metal material that excels in heat dissipation, for example, aluminum (Al) or copper (Cu).

Figure 4:
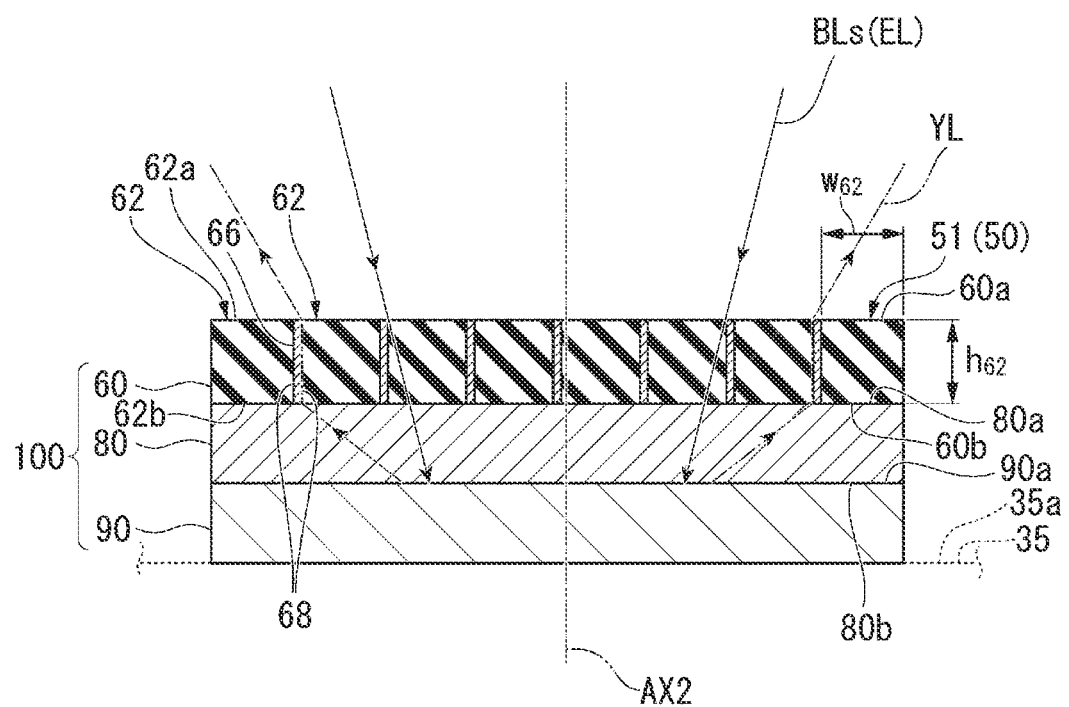
FIG. 4 is a cross-sectional view showing that excitation light and fluorescence propagates in part of the wavelength conversion apparatus shown in FIG. 3.

FIG. 4 is a cross-sectional view showing that the blue light $BL_S$ enters as the excitation light EL the wavelength converter 100 of the wavelength conversion apparatus 51, and that the fluorescence YL is emitted. The reflection layer 90 is laminated on the surface 35a of the substrate 35, as shown in FIGS. 3 and 4. The wavelength conversion layer 80 is laminated on a surface 90a of the reflection layer 90, and the optical array layer 60 is provided at a surface 80a of the wavelength conversion layer 80.

The blue light $BL_S$ having exited out of the first condenser optical system 26 described with reference to FIG. 2 enters in the form of collected light the wavelength conversion layer 80 via the surface 80a. The wavelength conversion layer 80 converts the blue light $BL_S$ in terms of wavelength into the fluorescence YL. That is, the wavelength conversion layer 80 contains a fluorescing material that absorbs the blue light $BL_S$ incident thereon, is excited thereby, and emits the fluorescence YL. The fluorescing material contains, for example, at least any one of the following oxide phosphors: yttrium aluminum garnet (YAG($Y_3Al_5O_{12}$):Ce) to which cerium (Ce) has been added as an activator; $Y_3(Al, Ga)_5O_{12}$; $Lu_3Al_5O_{12}$; and $TbAl_5O_{12}$. The wavelength conversion layer 80 may contain europium (Eu) in place of cerium (Ce) as the activator. The wavelength conversion layer 80 may further contain scatterers. The fluorescence YL generated by the wavelength conversion layer 80 exits via a surface 80b of the wavelength conversion layer 80, which is the surface opposite from the surface 80a.

The optical array layer 60 is formed of a plurality of cells 62. The cells 62 each have a surface (first side) 62b and a surface (second side) 62a. The fluorescence (light) YL, which is the result of the wavelength conversion performed by the wavelength conversion layer 80 and has exited via the surface 80a, is incident on the surface 62b. The fluorescence YL exits toward the side on which the blue light. $BL_S$ is incident out of the wavelength conversion apparatus 51 via the surface 62a. The cells 62 are each made of a material having high thermal conductivity and high transmittance at least for the blue light $BL_S$ and fluorescence YL, such as sapphire, alumina, YAG, and quartz. The cells 62 made of a material having high thermal conductivity and high transmittance allow heat TH generated in the wavelength conversion performed by the wavelength conversion layer 80 to be efficiently dissipated out of the wavelength conversion apparatus 51 via the cells 62. Furthermore, the fluorescence YL emitted from the wavelength conversion layer 80 efficiently exits via the surface 62a, and the blue light $BL_S$ efficiently enters the wavelength conversion layer 80.

Figure 5:
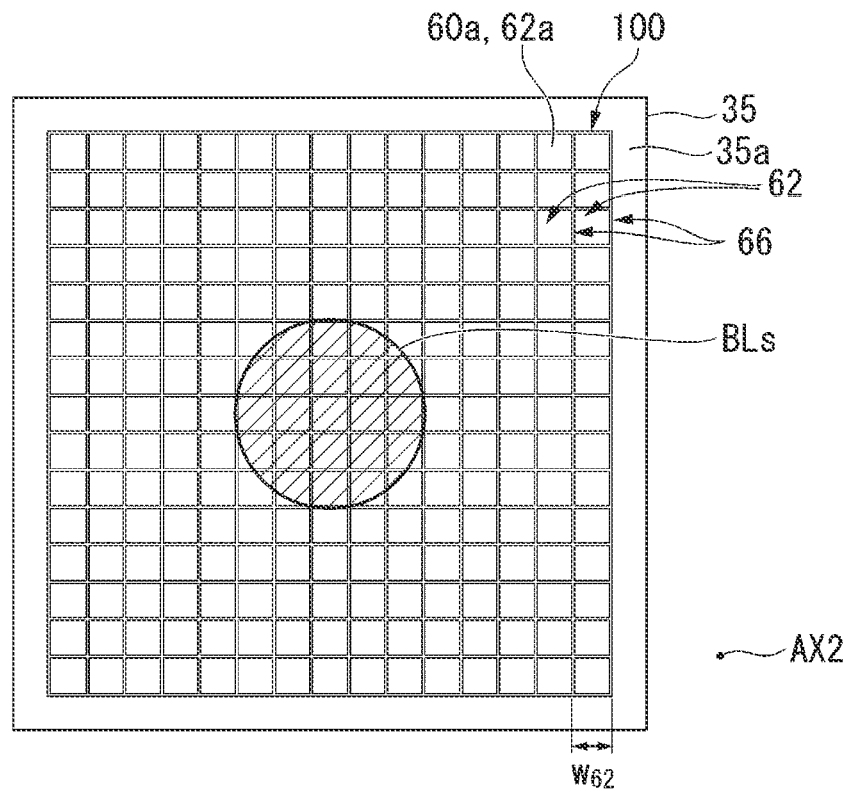
FIG. 5 is a plan view showing that the excitation light is incident on an optical array layer of the wavelength conversion apparatus shown in FIG. 3.
Figure 6:
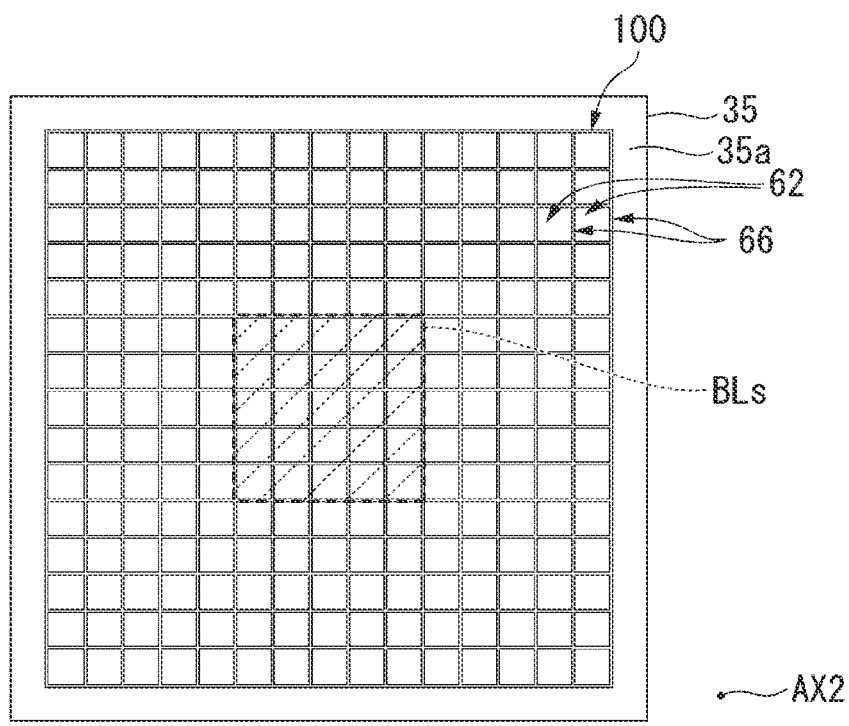
FIG. 6 is a plan view showing that the excitation light is incident on a wavelength conversion layer of the wavelength conversion apparatus shown in FIG. 3.
Figure 7:
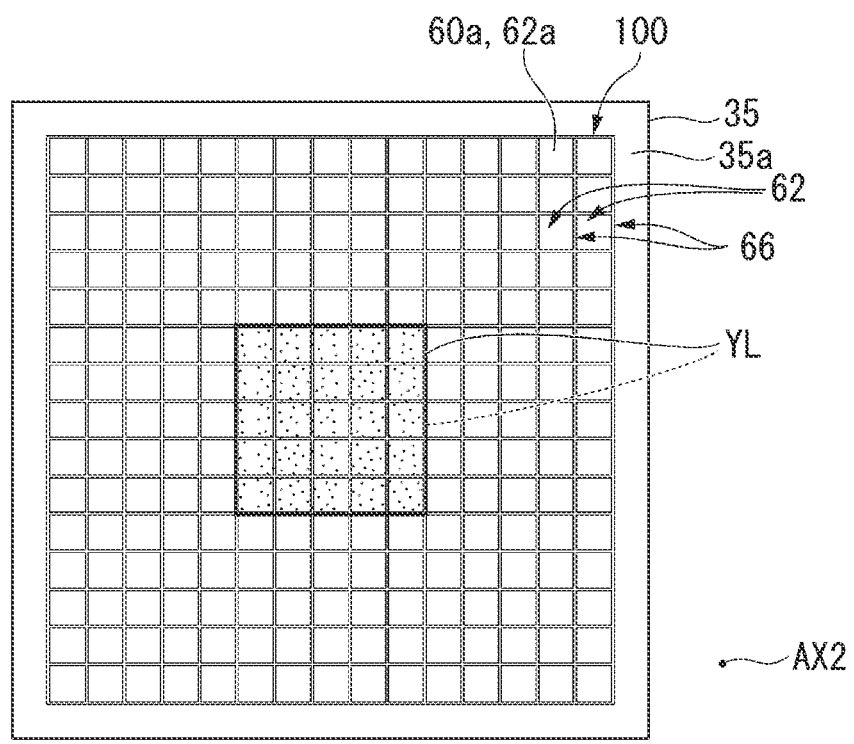
FIG. 7 is a plan view showing that the fluorescence is emitted from the wavelength conversion layer and the optical array layer of the wavelength conversion apparatus shown in FIG. 3.

FIG. 5 is a plan view viewed along the traveling direction of the blue light $BL_S$ and showing that the blue light $BL_S$ having a substantially circular shape is incident on the optical array layer 60. FIG. 6 is a plan view showing that the blue light $BL_S$ in FIG. 5 is incident on the wavelength conversion layer 80. FIG. 7 is a plan view showing that the fluorescence YL is emitted when the blue light $BL_S$ enters the wavelength conversion apparatus 51 as shown in FIG. 6. The cells 62 are each formed in a square shape in the plan view viewed along the traveling direction of the blue light $BL_S$, that is, along the optical axis AX2, as shown in FIGS. 5 and 6. A dimension $h_{62}$ of the cells 62 shown in FIGS. 3 and 4 in a height direction H thereof is equal to or greater than a dimension $w_{62}$ of the cells 62 shown in FIGS. 5 and 6 in the plan view thereof. The dimension $w_{62}$ of the cells 62 is the dimension in a plane perpendicular to the height direction H of the cells 62 and is also the dimension in a plane perpendicular to the traveling direction of the blue light $BL_S$ and to the optical axis AX2. The dimension $h_{62}$ of the cells 62 in the height direction H thereof is, for example, 1.0 to 1.5 times greater than the dimension $w_{62}$ of the cells 62 in the plan view thereof.

In the wavelength conversion apparatus 51 according to the first embodiment, a dielectric film 66 is interposed between the plurality of cells 62 in the optical array layer 60. The dielectric films 66 may be made of a reflective material containing, for example, silver (Ag) or Al or may be each formed of a dielectric multilayer film in which a plurality of suitable dielectric layers are alternately laminated on each other.

The optical array layer 60 has reflection surfaces 68, which extend from the surfaces 62b to the surfaces 62a of the plurality of cells 62 and are located at the interfaces between the cells 62 and 62 adjacent to each other along surfaces 60a and 60b, and the reflection surfaces 68 reflect the blue light $BL_S$ and the fluorescence YL. That is, the reflection surfaces 68 are each formed of side surfaces 66c and 66d of the dielectric film 66 disposed between the cells 62 adjacent to each other. The blue light $BL_S$ and the fluorescence YL incident on the reflection surfaces 68 through the cells 62 are specularly reflected off the reflection surfaces 68.

In FIG. 3, a variety of arrows show the propagation of the directional components of the blue light $BL_S$ and the fluorescence YL and the movement of a heat flux in the wavelength conversion apparatus 51. On the other hand, FIG. 4 shows the propagation of the entirety of the blue light $BL_S$ and the fluorescence YL, that is, the luminous flux as a whole. The path of a blue light component $BL_S11$ of the blue light $BL_S$, which enters the wavelength conversion layer 80 from outside the wavelength converter 100, that is, from above the wavelength converter 100 in FIGS. 3 and 4, inclines by a small angle with respect to the height direction H, and the blue light component $BL_S11$ does not impinge on the reflection surfaces 68, as shown in FIG. 3. The blue light component $BL_S11$ is therefore not reflected off the reflection surfaces 68 but passes through the optical array layer 60 and enters the wavelength conversion layer 80. On the other hand, a blue light component $BL_S12$ of the blue light $BL_S$, which enters the wavelength conversion layer 80 as described above, impinges on the reflection surface 68 in a cell 62. The blue light component $BL_S12$ therefore passes through the optical array layer 60 while being reflected off the reflection surfaces 68 and enters the wavelength conversion layer 80. Similarly, the path of a fluorescence component YL11 of the fluorescence YL, which exits out of the wavelength converter 100 via the wavelength conversion layer 80, inclines by a small angle with respect to the height direction H, and the fluorescence component YL11 does not impinge on the reflection surfaces 68. The fluorescence component YL11 is therefore not reflected off the reflection surfaces 68 but passes through the optical array layer 60 and exits out of the wavelength converter 100. On the other hand, a fluorescence component YL12 of the fluorescence YL, which exits out of the wavelength converter 100 via the wavelength conversion layer 80, impinges on the reflection surface 68 in a cell 62. The fluorescence component YL12 therefore passes through the optical array layer 60 while being reflected off the reflection surfaces 68 and exits out of the wavelength converter 100.

The number of times by which each of the components of the blue light $BL_S$ and the fluorescence YL is reflected off the reflection surface 68 in a cell 62 is determined by the angle of the traveling direction of the component of the blue light $BL_S$ or the fluorescence YL with respect to the optical axis AX2. The greater the angle of the traveling direction of each of the components of the blue light $BL_S$ and the fluorescence YL with respect to the optical axis AX2, the greater the number of times by which the component is reflected off the reflection surface 68.

As described above, the wavelength conversion apparatus 51 according to the first embodiment includes the wavelength conversion layer 80, which converts the blue light $BL_S$ in terms of wavelength into the fluorescence YL, and the optical array layer 60, which is formed of the plurality of cells 62 each having the surface 62b, on which the fluorescence YL, which is the result of the wavelength conversion performed by the wavelength conversion layer 80, is incident, and the surface 62a, via which the fluorescence YL exits. The optical array layer 60 has the reflection surfaces 68, which extend from the surfaces 60b to the surfaces 60a in the height direction H and are located at the interfaces between the cells 62 and 62 adjacent to each other along the surfaces 60a and 60b, and which reflect the fluorescence YL. For example, in the plan view along the traveling direction of the blue light $BL_S$ and the optical axis AX2, the blue light $BL_S$ has a circular shape and is incident on a portion of the surface 60a of the optical array layer 60, that is, the surfaces 62a of the plurality of cells 62 in the region occupied by 5×5=25 cells 62 in total, as shown in FIG. 5. In this case, the blue light $BL_S$ travels in a region of the optical array layer 60 that is the region occupied by the cells 62 that overlap with the blue light $BL_S$ at the surface 60a, as can be seen from FIGS. 3 and 4.

When reflected off the reflection surfaces 68, the blue light $BL_S$ does not pass through the cells 62 outside the region occupied by the cells 62 overlapping with the blue light $BL_S$ at the surface 60a but enters the wavelength conversion layer 80 with the beam area of the blue light $BL_S$ at the surface 60a substantially maintained. The blue light $BL_S$ incident on at least part of the surfaces 62a of the cells 62 of the optical array layer 60 in the plan view is, however, likely to spread across those cells 62, so that the blue light $BL_S$ bleeds into all the cells 62 overlapping with the blue light $BL_S$ at the surface 60a of the optical array layer 60, as shown in FIGS. 5 and 6. That is, the blue light $BL_S$ radiated onto the surface 60b of the optical array layer 60 and the surface 80a of the wavelength conversion layer 80 overlaps with the rectangular region occupied by 5×5=25 cells 62 in total, as shown in FIG. 6.

The fluorescence YL generated by the wavelength conversion layer 80 exits with the beam area of the fluorescence YL being approximately equal to the beam area of the blue light $BL_S$ that has been held by the optical array layer 60 at substantially the same value and travels in the direction opposite the traveling direction of the blue light $BL_S$ in the region occupied by the cells 62 that overlap with the fluorescence YL at the surface 60b of the optical array layer 60. The fluorescence YL reflected off the reflection surfaces 68 does not pass through the cells 62 outside the region occupied by the cells 62 overlapping with the fluorescence YL at the surface 60b but exits out of the optical array layer 60 with the beam area of the fluorescence YL at the surface 60b substantially maintained, as seen from FIGS. 3 and 4. The fluorescence YL that exits via the surface 80a of the wavelength conversion layer 80 and the surface 60a of the optical array layer 60 therefore overlaps with the rectangular region occupied by the 5×5=25 cells 62 in total, as shown in FIG. 7.

The wavelength conversion apparatus 51 according to the first embodiment, which includes the optical array layer 60 described above, allows at least part of the blue light $BL_S$ to enter the wavelength conversion layer 80 with the blue component $BL_S12$ reflected in the optical array layer 60 off the reflection surfaces 68 of the cells 62 that the at least part of the blue light $BL_S$ has entered so that the region of the blue light $BL_S$ in the plan view is maintained in the optical array layer 60. A decrease in the wavelength conversion efficiency in the wavelength conversion layer 80 due to an increase in the amount of spread of the blue light $BL_S$ in the plan view can therefore be suppressed as compared with a case where no optical array layer 60 is provided.

Furthermore, the wavelength conversion apparatus 51 according to the first embodiment can suppress the spread of the fluorescence YL in the plan view while the fluorescence component YL12 is reflected off the reflection surfaces 68 of the cells 62 that the fluorescence YL has entered and therefore allows the plan-view region of the fluorescence YL exiting via the surface 80a of the wavelength conversion layer 80 to substantially coincide with the plan-view region of the fluorescence YL exiting via the surface 60a of the optical array layer 60. A decrease in the efficiency of utilization of the fluorescence YL due to an increase in the amount of spread of the fluorescence YL in the plan view can therefore be suppressed as compared with the case where no optical array layer 60 is provided.

In the wavelength conversion apparatus 51 according to the first embodiment, the reflection surfaces 68 are each formed of the side surfaces 66c and 66d of the dielectric film 66. The blue light $BL_S$ and the fluorescence YL incident on each of the reflection surfaces 68 can therefore be efficiently reflected and guided through the cell 62. As a result, loss of the blue light $BL_S$ and fluorescence YL can be suppressed.

In the wavelength conversion apparatus 51 according to the first embodiment, the reflection surfaces 68 may each be a diffusive reflection surface. For example, the reflection surfaces 68 may have fine irregularities designed in correspondence with the wavelengths of the blue light $BL_S$ and the fluorescence YL. The reflection surfaces 68 each having a diffusive reflection surface allow enhancement of the directivity of the blue light $BL_S$ and fluorescence YL with respect to the travelling direction thereof and the optical axis AX2.

In the wavelength conversion apparatus 51 according to the first embodiment, the reflection surfaces 68 are not necessarily each formed of the dielectric film 66 and can be made of any material or medium that can form the reflection surface 68 at the interface between the cells 62 and reflect the blue light $BL_S$ and the fluorescence YL in accordance with the difference in refractive index between the material or medium of the reflection surface 68 and the material of the cells 62. In other words, the reflection surfaces 68 can be made of a material or a medium that has an appropriate refractive index in accordance with the refractive index of the material of the cells 62 and the peak wavelengths of the blue light $BL_S$ and the fluorescence YL. The material or medium of the reflection surfaces 68 may be so selected that the blue light component $BL_S12$ and the fluorescence component YL12 are totally reflected off the reflection surfaces 68. The configuration described above allows the blue light $BL_S$ to efficiently enter the wavelength conversion layer 80 and the fluorescence YL to efficiently exit out of the optical array layer 60. When sapphire or any other material described above is used as the material of the cells 62 of the optical array layer 60, the refractive index of the optical array layer 60 is about 1.7.

The wavelength conversion apparatus 51 according to the first embodiment may include an air layer between the cells 62 and 62 adjacent to each other along the surfaces 60a and 60b of the optical array layer 60, and the blue light $BL_S$ and the fluorescence YL may be reflected off side surfaces (interfaces) 62c and 62d of the cells 62 in accordance with the difference in refractive index between the cells 62 and the air layer. The configuration described above allows enhancement of the directivity of the blue light $BL_S$ and fluorescence YL with respect to the travelling direction thereof and the optical axis AX2. Since the surface area of the cells 62 exposed to the air outside the wavelength conversion apparatus 51 via the air layer increases, the heat dissipation capability of the wavelength conversion apparatus 51 can be improved, whereby an increase in the temperature caused by the heat TH generated when the wavelength conversion layer 80 generates the fluorescence YL can be suppressed.

The wavelength conversion apparatus 51 according to the first embodiment includes the reflection layer 90 at the surface 80b of the wavelength conversion layer 80, which is the surface opposite from the surface 80a facing the optical array layer 60, as described above. The blue light $BL_S$ enters the wavelength conversion layer 80 via the optical array layer 60. The fluorescence YL having exited via the surface 80b of the wavelength conversion layer 80 is reflected by the reflection layer 90, passes through the wavelength conversion layer 80, and enters the optical array layer 60. In the wavelength conversion apparatus 51 according to the first embodiment, the optical array layer 60 is used to cause the substantial irradiated area irradiated with the blue light (light) $BL_S$ incident on the wavelength conversion layer 80 from the optical array layer 60 to substantially coincide with the area occupied by the cells 62 that overlap with the irradiated area in the plan view. The wavelength conversion apparatus 51 according to the first embodiment can therefore suppress the spread of the irradiated region irradiated with the fluorescence YL emitted by the wavelength conversion layer 80 and the diffusion of the fluorescence YL and hence suppress the diffusion of the fluorescence YL that exits out of the optical array layer 60. As a result, a decrease in the wavelength conversion efficiency in the wavelength conversion apparatus 51 according to the first embodiment can be suppressed as compared with wavelength conversion apparatuses of related art.

Second Embodiment

A second embodiment of the present disclosure will next be described with reference to FIGS. 8 to 10.

In the second and subsequent embodiments, configurations common to those in the embodiment described above, that is, the first embodiment, have the same reference characters as those of the configurations in the embodiment described above and will not be described.

Figure 8:
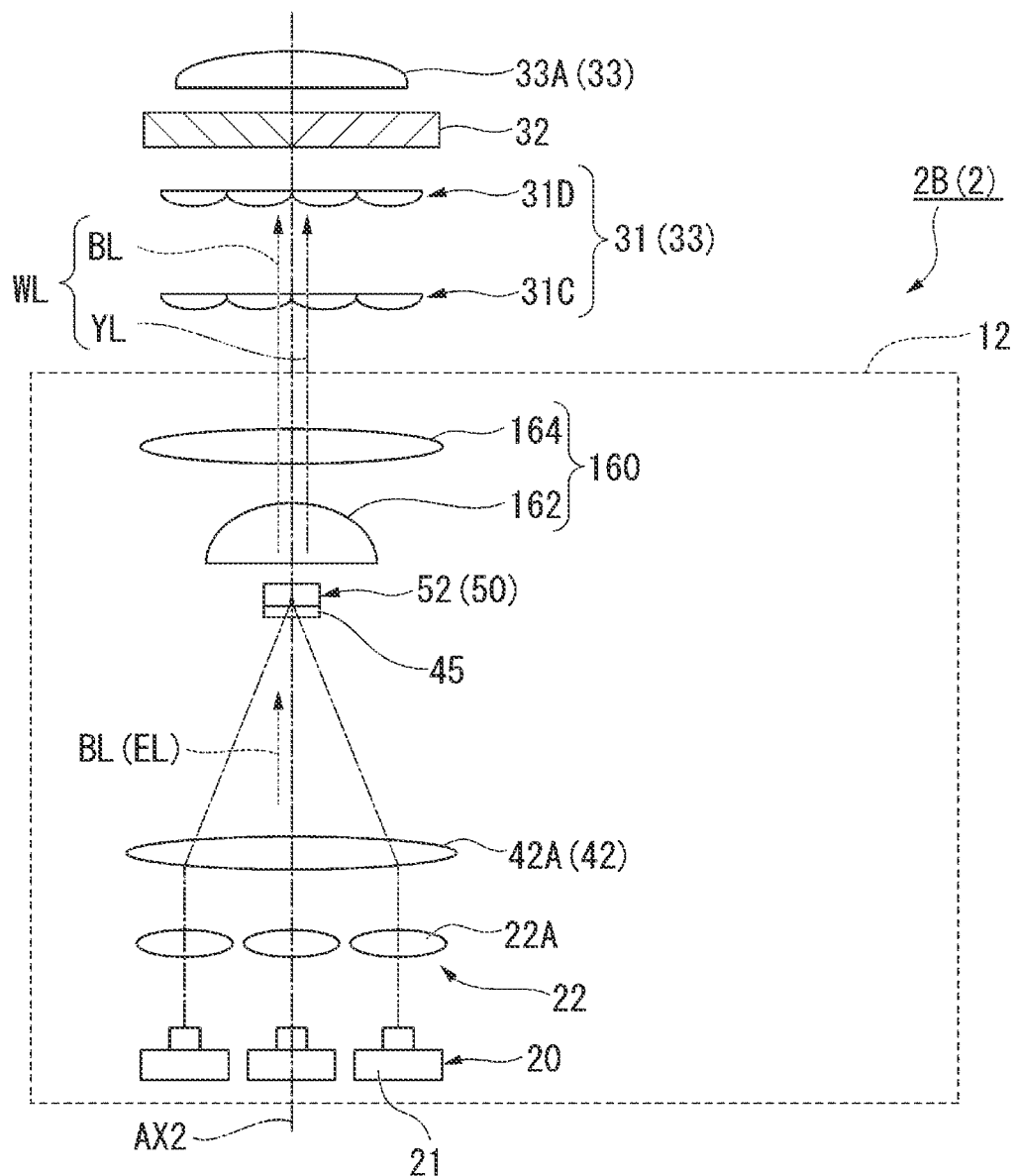
FIG. 8 is a schematic configuration diagram of the light source apparatus according to a second embodiment.

The projector according to the second embodiment has the same configuration as that of the projector 1 according to the first embodiment except that the light source apparatus 2A is replaced with a light source apparatus 2B shown in FIG. 8. FIG. 8 is a schematic configuration diagram of the light source apparatus 2B provided in the projector 1 according to the second embodiment.

Light Source Apparatus

The light source apparatus 2B according to the second embodiment includes a light emitting unit 12, the optical integration system 31, the polarization conversion element 32, and the superimposed lens 33A, as shown in FIG. 8.

The light emitting unit 12 includes the array light source 20, the collimator optical system 22, a condenser optical system 42, a dichroic film 45, a wavelength conversion apparatus 52 according to the second embodiment, and a pickup optical system 160. The array light source 20, the collimator optical system 22, the condenser optical system 42, the wavelength conversion apparatus 52, and the pickup optical system 160 are sequentially arranged along the optical axis AX2.

The array light source 20 includes a plurality of semiconductor lasers (excitation light sources) 21 as the solid-state light source. The plurality of semiconductor lasers 21 are arranged in an array in a plane perpendicular to the optical axis AX2.

The condenser optical system 42 is formed, for example, of a single convex lens 42A. The condenser optical system 42 is disposed on the optical axis AX2 of white light BL outputted from the array light source 20, collects the blue light BL, which is parallelized light into which the excitation light EL is converted by the collimator optical system 22, and directs the collected blue light BL to the wavelength conversion apparatus 52.

The wavelength conversion apparatus 52 has the function of transmitting part of the blue light BL outputted from the array light source 20 and converting the remaining blue light BL into the fluorescence YL. The wavelength conversion apparatus 52 contains a fluorescing material that absorbs the remaining blue light BL and emits the fluorescence YL of yellow containing red light and green light. The wavelength at which the intensity of the emitted fluorescence YL peaks is, for example, about 550 nm.

The dichroic film 45 is provided on the light incident side of the wavelength conversion apparatus 52 that is the side on which the white light BL is incident. The dichroic film 45 transmits the blue light BL and reflects the fluorescence YL. The blue light BL having passed through the wavelength converter 52 and the fluorescence YL are combined with each other to form the white light WL.

The pickup optical system 160 includes, for example, a pickup lens 162 and a pickup lens 164. The pickup optical system 160 captures the white light WL outputted from the wavelength conversion apparatus 52, converts the white light WL into substantially parallelized light, and directs the parallelized white light WL toward the optical integration system 31. The optical integration system 31 is formed, for example, of a lens array 31C and a lens array 31D. In each of the lens arrays 31C and 31D, a plurality of microlenses are arranged along the direction perpendicular to the optical axis AX2.

The white light WL having entered the optical integration system 31 enters the polarization converter 32. The polarization converter 32 converts the white light WL containing the unpolarized fluorescence YL into linearly polarized light. The superimposing lens 33A and the optical integration system 31 cooperate with each other in such a way that the white light WL having passed through the polarization converter 32 generates white light WL having a uniform illuminance distribution in the illumination receiving region. That is, the light source apparatus 2B generates the white light WL as the illumination light used in the projector according to the second embodiment.

In the light source apparatus 2B according to the second embodiment, the optical system can be configured to be substantially linearly along the optical axis AX2, whereby the optical system can be readily designed and assembled.

Wavelength Conversion Apparatus

Figure 9:
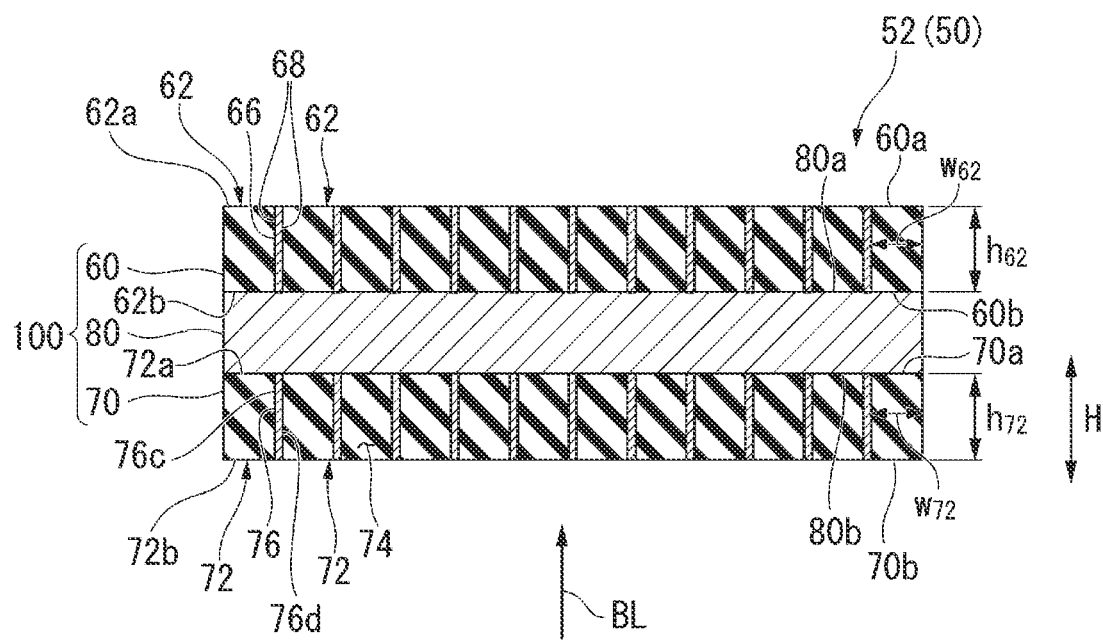
FIG. 9 is a cross-sectional view of part of a wavelength conversion apparatus according to the second embodiment provided in the light source apparatus shown in FIG. 8.

FIG. 9 is a cross-sectional view of a wavelength conversion apparatus 52 according to the second embodiment. The wavelength conversion apparatus 52 does not include the reflection layer 90 of the wavelength conversion apparatus 51 according to the first embodiment but includes an optical array layer (light-incident-side optical array layer) 70 in place of the reflection layer 90. That is, the wavelength conversion apparatus 52 includes the optical array layer 60, the wavelength conversion layer 80, and the optical array layer 70. The optical array layer 60, the wavelength conversion layer 80, and the optical array layer 70 form the wavelength converter 100, which absorbs the blue light BL and generates the fluorescence YL in the wavelength conversion apparatus 52.

The optical array layer 70 is formed of a plurality of cells 72. The cells 72 each have a surface (third surface) 72b and a surface (fourth surface) 72a. The blue light (excitation light) having exited out of the condenser optical system 42 described with reference to FIG. 8 is incident in the form of the collected light on the surfaces 72b. The blue light BL having propagated through the cells 72 exits via the surfaces 72a. The cells 72 are each made of a material having high thermal conductivity and high transmittance at least for the blue light BL and fluorescence YL, such as sapphire, alumina, YAG, and quartz, as the cells 62 are. The cells 72 made of a material having high thermal conductivity and high transmittance allow the heat TH generated in the wavelength conversion performed by the wavelength conversion layer 80 to be efficiently dissipated out of the wavelength conversion apparatus 52 not only via the cells 62 but via the cells 72. In the wavelength conversion apparatus 52, the fluorescence YL emitted from the wavelength conversion layer 80 enters the optical array layer 60 via the surfaces 62b and efficiently exits via the surface 60a.

The cells 72 are each formed, for example, in a square shape in the plan view along the traveling direction of the blue light BL. A dimension $h_{72}$ of the cells 72 in the height direction H thereof is greater than a dimension $w_{72}$ of the cells 72 in the plan view thereof. The dimension $w_{72}$ of the cells 72 is the dimension in a plane perpendicular to the height direction H of the cells 72 and is also the dimension perpendicular to the travelling direction of the blue light BL and the optical axis AX2. The dimension $h_{72}$ of the cells 72 in the height direction H thereof is, for example, 1.2 to 2.0 times greater than the dimension $w_{72}$ of the cells 72 in the plan view thereof. In the wavelength conversion apparatus 52, the dimension $w_{72}$ of the cells 72 in the plan view thereof is substantially equal to the dimension $w_{62}$ of the cells 62 in the plan view thereof.

In the wavelength conversion apparatus 52, a dielectric film 76 is interposed between the plurality of cells 72 in the optical array layer 70. The dielectric films 76 may be made of a reflective material containing Ag or Al or may be each formed of a dielectric multilayer film in which a plurality of suitable dielectric layers are alternately laminated on each other, as the dielectric films 66 are.

The optical array layer 70 has reflection surfaces 78, which extend from the surfaces 72b to the surfaces 72a of the plurality of cells 72 and are located at the interfaces between the cells 72 and 72 adjacent to each other along surfaces 70a and 70b, and the reflection surfaces 78 reflect the blue light BL. That is, the reflection surfaces 78 are each formed of side surfaces 76c and 76d of the dielectric film 76 disposed between the cells 72 adjacent to each other. The blue light BL incident on the reflection surfaces 78 through the cells 72 is specularly reflected off the reflection surfaces 78.

Out of the blue light BL that enters the wavelength conversion layer 80 from outside the wavelength converter 100, that is, from below the wavelength converter 100 in FIG. 9, the blue light component traveling along a path inclining by a small angle with respect to the height direction H and not impinging on the reflection surfaces 78 is not reflected off the reflection surfaces 78 but passes through the optical array layer 70 and enters the wavelength conversion layer 80. On the other hand, out of the blue light BL that enters the wavelength conversion layer 80 as described above, the blue light component that impinges on the reflection surfaces 78 in the cells 72 passes through the optical array layer 70 while being reflected off the reflection surfaces 78 and enters the wavelength conversion layer 80.

The number of times by which each component of the blue light BL is reflected off the reflection surface 78 in a cell 72 is determined by the angle of the traveling direction of the component of the blue light BL with respect to the optical axis AX2. The greater the angle of the traveling direction of each component of the blue light BL with respect to the optical axis AX2, the greater the number of times by which the component is reflected off the reflection surface 78.

As described above, the wavelength conversion apparatus 52 according to the second embodiment includes the optical array layer 70, which causes the blue light BL to be incident on the surface 80b of the wavelength conversion layer 80, separately from the optical array layer 60 in the first embodiment. The optical array layer 70 is formed of the plurality of cells 72 each having the surface 70b, on which the blue light BL is incident, and the surface 70a, via which the incident blue light BL exits, and includes the light reflecting surfaces 78, which extends from the surface 70b to the surface 70a and are located at the interfaces between cells 72 and 72 adjacent to each other along the surfaces 70a and 70b. The blue light BL enters the wavelength conversion layer 80 via the optical array layer 70, and the fluorescence YL generated by the wavelength conversion enters the optical array layer 60.

In the wavelength conversion apparatus 52 having the configuration described above, in the optical array layer 70, the blue light BL travels in the region occupied by the cells 72 overlapping with the blue light BL at the surface 70b. At least part of the blue light BL reflected off the reflection surfaces 78 does not pass through the cells 72 outside the region occupied by the cells 72 overlapping with the blue light BL at the surface 70b but enters the wavelength conversion layer 80 with the beam area of the blue light BL and the irradiated region irradiated thereby at the surface 70b substantially maintained. It is, however, noted that the blue light BL incident on at least part of the surfaces 72b of the cells 72 of the optical array layer 70 in the plan view is likely to spread across those cells 72, as the blue light BL bleeds in the first embodiment. That is, the blue light BL bleeds into all the cells 72 overlapping with the blue light BL at the surface 70b of the optical array layer 70.

In the wavelength conversion apparatus 52, the fluorescence YL generated by the wavelength conversion layer 80 exits with the beam area being approximately equal to those of the blue light BL substantially maintained by the optical array layer 70 and travels in the region occupied by the cells 62 overlapping with the fluorescence YL at the surface 60b of the optical array layer 60 in the same direction as the direction in which the blue light BL enters the wavelength conversion layer 80. The fluorescence YL does not pass through the cells 62 outside the region occupied by the cells 62 overlapping with the fluorescence YL at the surface 60b but exits out of the optical array layer 60 with the beam area of the fluorescence YL substantially maintained at the surface 60b.

The wavelength conversion apparatus 52 according to the second embodiment, which includes the optical array layers 60 and 70 described above, allows at least part of the blue light BL to enter the wavelength conversion layer 80 with the plan-view region of the blue light BL in the optical array layer 70 maintained while the at least part of blue light BL is reflected in the optical array layer 70 off the reflection surfaces 78 of the cells 72 on which the at least part of the blue light BL is incident. A decrease in the wavelength conversion efficiency in the wavelength conversion layer 80 due to an increase in the amount of spread of the blue light BL in the plan view can therefore be suppressed as compared with a case where no optical array layer 70 is provided.

Furthermore, the wavelength conversion apparatus 52 according to the second embodiment can suppress the spread of the fluorescence YL in the plan view while the fluorescence component YL12 is reflected off the reflection surfaces 68 of the cells 62 that the fluorescence YL has entered and therefore allows the plan-view region of the fluorescence YL exiting via the surface 80a of the wavelength conversion layer 80 to substantially coincide with the plan-view region of the fluorescence YL exiting via the surface 60a of the optical array layer 60. A decrease in the efficiency of utilization of the fluorescence YL due to an increase in the amount of spread of the fluorescence YL in the plan view can therefore be suppressed as compared with the case where no optical array layer 60 is provided. Furthermore, the wavelength conversion apparatus 52 according to the second embodiment can suppress the diffusion of the blue light BL in the plan view in the optical array layer 70.

The wavelength conversion apparatus 52 according to the second embodiment can be changed as the wavelength conversion apparatus 51 according to the first embodiment is changed in terms of the common configurations, and the changed wavelength conversion apparatus 52 provides the same effects and advantages as those provided by the changed wavelength conversion apparatus 51 according to the first embodiment.

Figure 10:
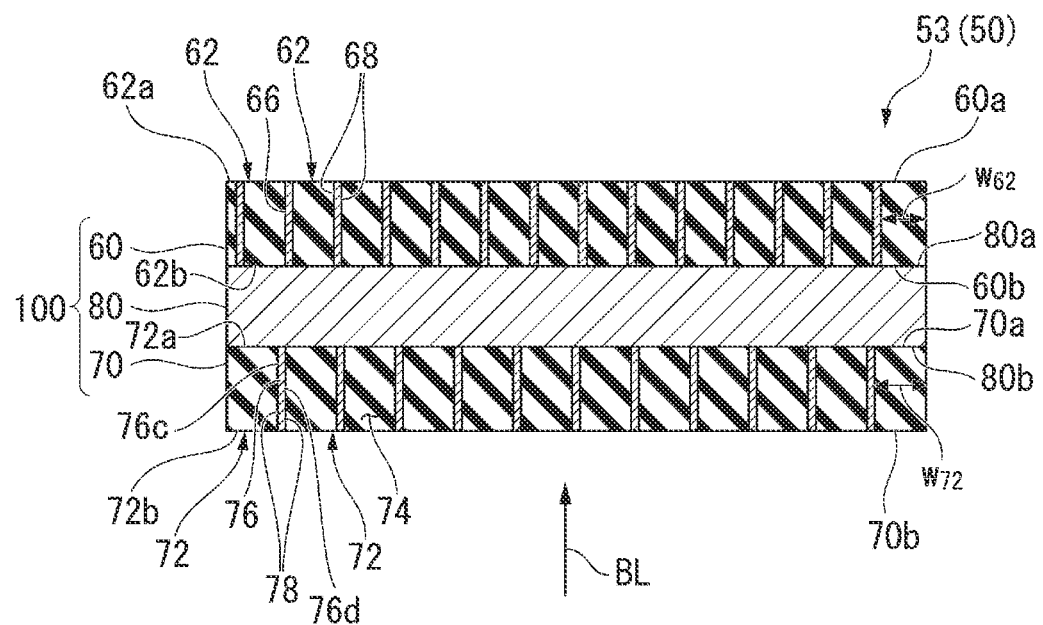
FIG. 10 is a cross-sectional view of part of the wavelength conversion apparatus according to a variation of the second embodiment.

A wavelength conversion apparatus 53 shown in FIG. 10 is a variation of the wavelength conversion apparatus 52 according to the second embodiment. FIG. 10 is a cross-sectional view of the wavelength conversion apparatus 53 according to the variation of the second embodiment. In the wavelength conversion apparatus 53, the dimension (cell size) $w_{62}$ of the cells 62 of the optical array layer 60 in the plan view is smaller than the dimension (cell size) $w72$ of the cells 72 of the optical array layer 70 in the plan view, which is shifted from the optical array layer 60 toward the side on which the blue light BL is incident, as shown in FIG. 10. The wavelength conversion apparatus 53 according to the variation of the second embodiment allows enhancement of the directivity of the fluorescent YL with respect to the direction parallel to the optical axis AX2 as compared with the blue light BL as the excitation light EL.

Other Embodiments

Descriptions will be made of variations of the optical array layer 60 of both the wavelength conversion apparatuses 51 and 52 according to the first and second embodiments described above and the optical array layer 70 of both the wavelength conversion apparatus 52 according to the second embodiment and the wavelength conversion apparatus 53 according to the variation of the wavelength conversion apparatus 52.

Figure 11:
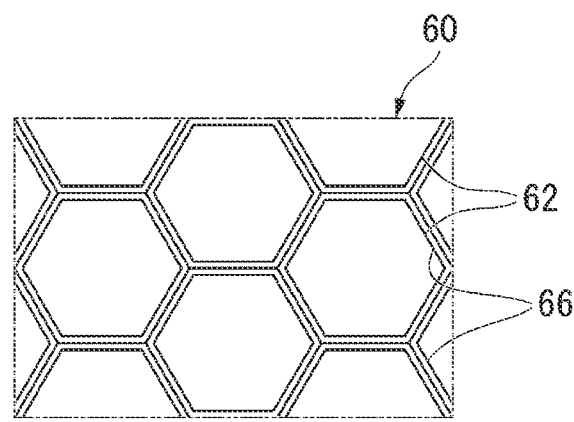
FIG. 11 is a plan view of a first variation of the optical array layer.
Figure 12:
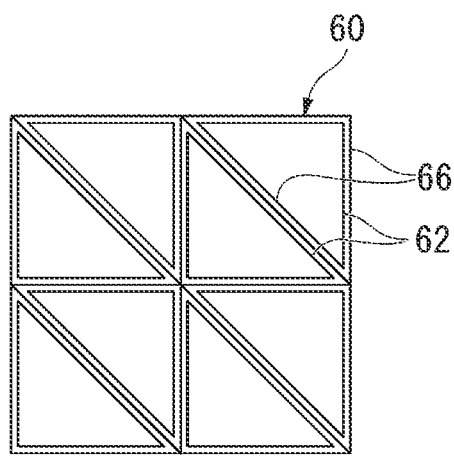
FIG. 12 is a plan view of a second variation of the optical array layer.

FIGS. 11 and 12 are plan views of first and second variations of the optical array layer 60. The shape of the cells 62 of the optical array layer 60 in the plan view is not limited to the square shape shown by way of example in the embodiments described above. The cells 62 may each have a regular hexagonal shape in the plan view, as shown in FIG. 11. The cells 62 may each have an isosceles triangular shape in the plan view as a result of division of a square shape by one diagonal thereof, as shown in FIG. 12. When the cells 62 each have a regular hexagonal shape in the plan view, the dimension $w_{62}$ is the diameter of the regular hexagonal shape. When the cells 62 each have an isosceles triangular shape in the plan view, the dimension $w_{62}$ is the length of each of the two equilateral sides of the isosceles triangular shape. The cells 62 may each have any shape other than a square shape, the regular hexagonal shape, and the isosceles triangular shape, the latter two of which are shown by way of example in FIGS. 11 and 12, and it is preferable to set the shape of the cells 62 as appropriate in such a way that a desired shape of the fluorescent YL in the plan view is formed in consideration of the occurrence of the aforementioned bleeding of the blue light $BL_S$ and BL as the excitation light EL.

Figure 13:
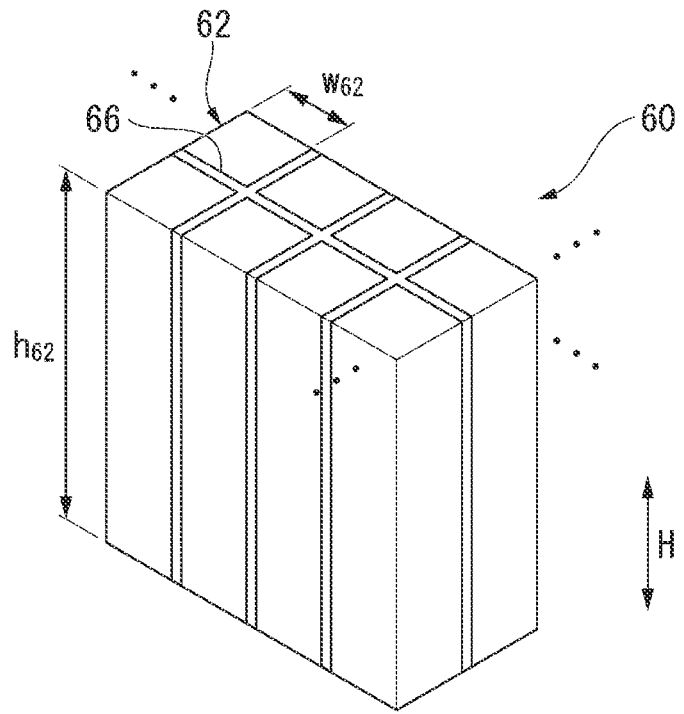
FIG. 13 is a perspective view of a third variation of the optical array layer.
Figure 14:
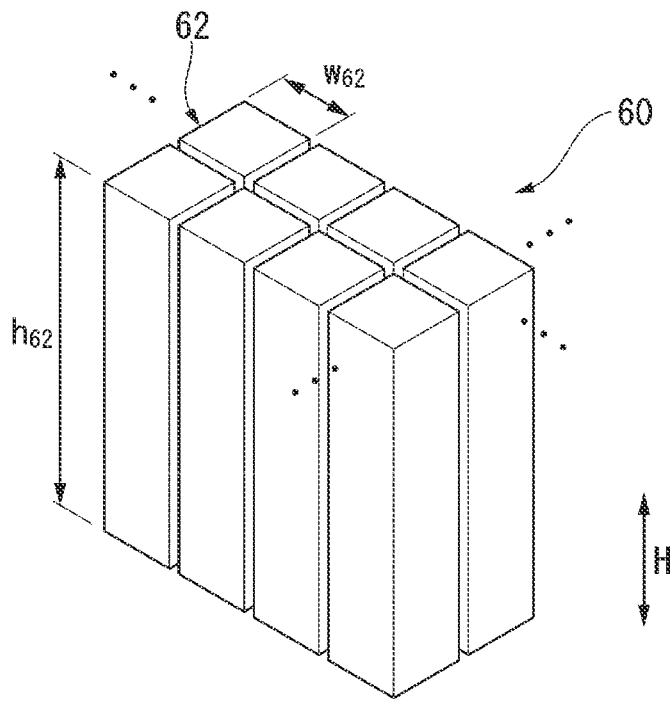
FIG. 14 is a perspective view of a fourth variation of the optical array layer.
Figure 15:
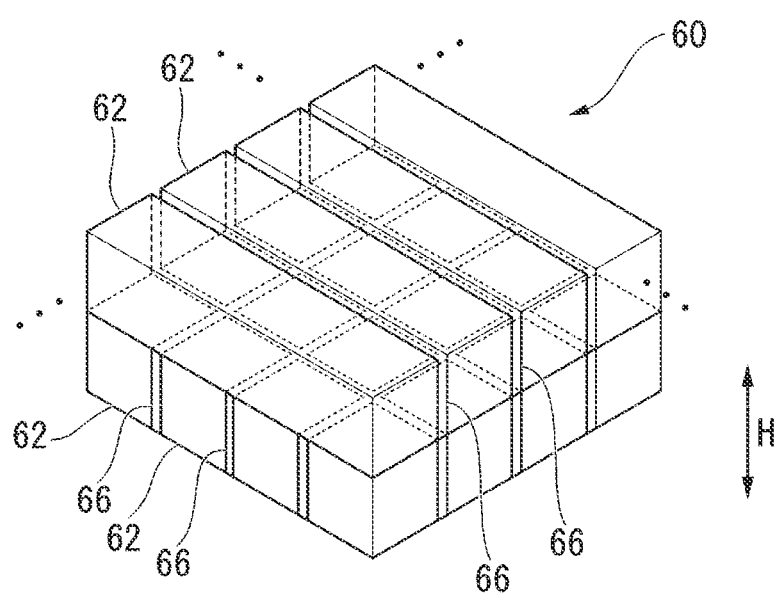
FIG. 15 is a perspective view of a fifth variation of the optical array layer.

FIGS. 13 to 15 are perspective views of third to fifth variations of the optical array layer 60. The cells 62 may each have a columnar structure, as shown in FIGS. 13 and 14. When the cells 62 each have a columnar structure, the dimension $h_{62}$ of the cells 62 in the height direction H thereof is, for example, 2.0 to 10.0 times greater than the dimension $w_{62}$ of the cells 62 in the plan view thereof. The cells 62 each having a columnar structure as described above allow enhancement of the directivity of the blue light $BL_S$ and BL and the fluorescence YL with respect to the direction parallel to the height direction H of the cells 62. As a result, a decrease in the wavelength conversion efficiency in the wavelength conversion apparatus can be suppressed.

The cells 62 may each have a columnar structure, and the plurality of cells 62 may be separate from each other, as shown in FIG. 14. According to the configuration described above, since the surface area of the wavelength conversion apparatus 51 that is the area exposed to the outside air via the air layer increases, as compared with a case where the cells 62 each do not have a columnar structure, the heat dissipation capability of the wavelength conversion apparatus can be improved, whereby an increase in the temperature caused by the heat TH generated by the wavelength conversion layer 80 can be suppressed.

In the optical array layer 60, the plurality of cells 62 each having a columnar structure may be laminated on each other with the axial core direction thereof rotated by 90° in the plan view along the traveling direction of the excitation light EL at predetermined height intervals in the traveling direction of the excitation light EL, that is, the height direction H, as shown in FIG. 15. According to the optical array layer 60 shown in FIG. 15, the plurality of cells 62 that overlap with each other in the height direction H in the plan view function as secondary cells, whereby the spread of the irradiated regions irradiated with the blue light $BL_S$ and BL and the fluorescence YL propagating in the cells 62 is suppressed alternately in two directions intersecting with each other at 90° in a plane perpendicular to the height direction H. The irradiated regions in the plan view irradiated with the excitation light EL and the fluorescence YL in the optical array layer can thus be maintained, whereby the excitation light EL and the fluorescence YL can be caused to enter or exit out of the wavelength conversion layer 80.

Preferable embodiments of the present disclosure have been described above in detail. The present disclosure is, however, not limited to a specific embodiment, and a variety of modifications and changes can be made to the embodiments within the scope of the substance of the present disclosure described in the claims. Furthermore, the components in a plurality of embodiments can be combined with each other as appropriate.

For example, the aforementioned second embodiment has been described with reference to the wavelength conversion apparatus 52, which is what is called a transmissive wavelength conversion apparatus, but the wavelength conversion apparatus 52 may be disposed on a circumferential surface of a rotating wheel that is not shown. That is, the light source apparatus according to the present disclosure does not necessarily have a specific configuration, and the light source apparatus according to the present disclosure includes at least an excitation light source that outputs the excitation light EL and the wavelength conversion apparatus according to the present disclosure.

The aforementioned embodiments have been described with reference to the case where the light source apparatus according to the present disclosure is incorporated in a projector, but not necessarily. The light source apparatus according to the present disclosure may also be used as a lighting apparatus, a headlight of an automobile, a head mounted display, and other components.

A wavelength conversion apparatus according to an aspect of the present disclosure may have the configuration below.

The wavelength conversion apparatus according to the aspect of the present disclosure includes a wavelength conversion layer that converts excitation light in terms of wavelength and an optical array layer formed of a plurality of cells each having a first surface on which light as a result of the wavelength conversion performed by the wavelength conversion layer is incident and a second surface via which the light exits, and the optical array layer has a reflection surface that extends from the first surface to the second surface, is located at the interface between the cells adjacent to each other, and reflects the light.

In the wavelength conversion apparatus according to the aspect of the present disclosure, the reflection surface may be formed of a dielectric film.

In the wavelength conversion apparatus according to the aspect of the present disclosure, the reflection surface may have a diffusive reflection surface.

In the wavelength conversion apparatus according to the aspect of the present disclosure, an air layer may be formed between the cells adjacent to each other, and the light may be reflected off the interface between each of the cells and the air layer in accordance with the difference in refractive index between the cells and the air layer.

In the wavelength conversion apparatus according to the aspect of the present disclosure, the dimension of the cells in the height direction thereof may be greater than the in-plane dimension of the cells in a plane perpendicular to the height direction.

In the wavelength conversion apparatus according to the aspect of the present disclosure, the plurality of cells may be separate from each other.

The wavelength conversion apparatus according to the aspect of the present disclosure may further include a reflection layer at a surface of the wavelength conversion layer that is the surface opposite from the surface facing the optical array layer. The excitation light may enter the wavelength conversion layer via the optical array layer, and the light converted in terms of wavelength and reflected off the reflection layer may enter the optical array layer.

The wavelength conversion apparatus according to the aspect of the present disclosure may further include a light-incident-side optical array layer that causes the excitation light to be incident on a surface of the wavelength conversion layer that is the surface opposite from the surface facing the optical array layer. The light-incident-side optical array layer may be formed of a plurality of cells each having a third surface on which the excitation light is incident and a fourth surface via which the incident excitation light exits and have a reflection surface that extends from the third surface to the fourth surface, is located at the interface between adjacent cells, and reflects the light. The excitation light may enter the wavelength conversion layer via the light-incident-side optical array layer, and the light converted in terms of wavelength may enter the optical array layer.

In the wavelength conversion apparatus according to the aspect of the present disclosure, the size of the cells in the optical array layer may be smaller than the size of the cells in the light-incident-side optical array layer.

A light source apparatus according to another aspect of the present disclosure may have the configuration below.

The light source apparatus according to the other aspect of the present disclosure includes an excitation light source and the wavelength conversion apparatus according to the aforementioned aspect of the present disclosure, and the wavelength conversion layer of the wavelength conversion apparatus is irradiated with excitation light outputted from the excitation light source.

A projector according to another aspect of the present disclosure may have the configuration below.

A projector according to the other aspect of the present disclosure includes the light source apparatus according to the aforementioned aspect of the present disclosure, a light modulator that modulates light from the light source apparatus in accordance with image information, and a projection optical apparatus that projects the light modulated by the light modulator.

What is claimed is:

1. A wavelength conversion apparatus comprising:
a wavelength conversion layer that converts excitation light in terms of wavelength;
an optical array layer formed of a plurality of cells each having a first surface on which light as a result of the wavelength conversion performed by the wavelength conversion layer is incident and a second surface via which the light exits;
a reflection layer at a surface of the wavelength conversion layer that is a surface opposite from a surface facing the optical array layer,
wherein the optical array layer has a reflection surface that extends from the first surface to the second surface, is located at an interface between the cells adjacent to each other, and reflects the light, and
the excitation light enters the wavelength conversion layer via the optical array layer, and the light converted in terms of wavelength and reflected off the reflection layer enters the optical array layer.

2. The wavelength conversion apparatus according to claim 1, wherein the reflection surface is formed of a dielectric film.

3. The wavelength conversion apparatus according to claim 1, wherein the reflection surface has a diffusive reflection surface.

4. The wavelength conversion apparatus according to claim 1,
wherein an air layer is formed between the cells adjacent to each other, and
the light is reflected off an interface between each of the cells and the air layer in accordance with a difference in refractive index between the cells and the air layer.

5. The wavelength conversion apparatus according to claim 1, wherein a dimension of the cells in a height direction thereof is greater than an in-plane dimension of the cells in a plane perpendicular to the height direction.

6. The wavelength conversion apparatus according to claim 5, wherein the plurality of cells are separate from each other.

7. The wavelength conversion apparatus according to claim 1, further comprising
a light-incident-side optical array layer that causes the excitation light to be incident on a surface of the wavelength conversion layer that is a surface opposite from a surface facing the optical array layer,
wherein the light-incident-side optical array layer is formed of a plurality of cells each having a third surface on which the excitation light is incident and a fourth surface via which the incident excitation light exits and has a reflection surface that extends from the third surface to the fourth surface, is located at an interface between adjacent cells, and reflects the light, and
the excitation light enters the wavelength conversion layer via the light-incident-side optical array layer, and the light converted in terms of wavelength enters the optical array layer.

8. The wavelength conversion apparatus according to claim 7, wherein a size of the cells in the optical array layer is smaller than a size of the cells in the light-incident-side optical array layer.

9. A light source apparatus comprising:
an excitation light source; and
the wavelength conversion apparatus according to claim 1,
wherein the wavelength conversion layer of the wavelength conversion apparatus is irradiated with excitation light outputted from the excitation light source.

10. A projector comprising:
the light source apparatus according to claim 9;
a light modulator that modulates light from the light source apparatus in accordance with image information; and
a projection optical apparatus that projects the light modulated by the light modulator.

11. A wavelength conversion apparatus comprising:
a wavelength conversion layer that converts excitation light in terms of wavelength;
an optical array layer formed of a plurality of cells each having a first surface on which light as a result of the wavelength conversion performed by the wavelength conversion layer is incident and a second surface via which which the light exits; and
a light-incident-side optical array layer that causes the excitation light to be incident on a surface of the wavelength conversion layer that is a surface opposite from a surface facing the optical array layer,
wherein the optical array layer has a reflection surface that extends from the first surface to the second surface, is located at an interface between the cells adjacent to each other, and reflects the light,
the light-incident-side optical array layer is formed of a plurality of cells each having a third surface on which the excitation light is incident and a fourth surface via which the incident excitation light exits and has a reflection surface that extends from the third surface to the fourth surface, is located at an interface between adjacent cells, and reflects the light, and
the excitation light enters the wavelength conversion layer via the light-incident-side optical array layer, and the light converted in terms of wavelength enters the optical array layer.

12. A wavelength conversion apparatus comprising:
a wavelength conversion layer that converts excitation light in terms of wavelength; and
an optical array layer formed of a plurality of cells each having a first surface on which light as a result of the wavelength conversion performed by the wavelength conversion layer is incident and a second surface via which the light exits;
wherein the optical array layer has a reflection surface that extends from the first surface to the second surface, is located at an interface between the cells adjacent to each other, and reflects the light, and
a dimension of the cells in a height direction thereof is greater than an in-plane dimension of the cells in a plane perpendicular to the height direction.

* * * * *